(12) United States Patent
Marvais et al.

(10) Patent No.: US 9,003,485 B2
(45) Date of Patent: *Apr. 7, 2015

(54) SYSTEMS AND METHODS FOR THE RAPID DEPLOYMENT OF NETWORK SECURITY DEVICES

(71) Applicant: WatchGuard Technologies, Inc., Seattle, WA (US)

(72) Inventors: Nick Marvais, Issaquah, WA (US); Sin-Yaw Wang, Seattle, WA (US); Lee W. Bothwell, Snoqualmie, WA (US); Shari Marlie McLaren, Kirkland, WA (US); Roger Brian Alan Klorese, Seattle, WA (US); Johnni M. Aguirre, Bellevue, WA (US); William James Smith, Bainbridge Island, WA (US); Yong Wang, Redmond, WA (US); Han Zhang, Irvine, CA (US); Todd Alan Wallen, Auburn, WA (US)

(73) Assignee: WatchGuard Technologies, Inc., Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/452,370

(22) Filed: Aug. 5, 2014

(65) Prior Publication Data

US 2014/0351882 A1 Nov. 27, 2014

Related U.S. Application Data

(63) Continuation of application No. 13/659,101, filed on Oct. 24, 2012, now Pat. No. 8,799,992.

(51) Int. Cl.
*G06F 21/00* (2013.01)
*H04L 29/06* (2006.01)
(Continued)

(52) U.S. Cl.
CPC . *H04L 63/20* (2013.01); *G06F 8/60* (2013.01); *H04L 41/0893* (2013.01);
(Continued)

(58) Field of Classification Search
CPC .............. G06F 3/061; G06F 8/60; G06F 8/76
USPC ...................... 726/1; 709/220, 226
See application file for complete search history.

(56) References Cited

U.S. PATENT DOCUMENTS 8,225,281 B1 7/2012 Hardinger et al.
2002/0161874 A1 10/2002 McGuire
(Continued)

OTHER PUBLICATIONS

Joon Heo, et al;"Identity-based mutual device authentication schemes for PLC system"; Power Line Communications and Its Applications, 2008. ISPLC 2008. IEEE International Symposium on DOI: 10.1109/ISPLC.2008.4510397 Publication Year: 2008 , pp. 47-51.*

(Continued)

*Primary Examiner* — Harunur Rashid
*Assistant Examiner* — Angela Holmes
(74) *Attorney, Agent, or Firm* — Kory D. Christensen; Stoel Rives LLP

(57) ABSTRACT

A configuration service comprises a deployment package and a production configuration for a network security device. One or more configuration parameters of the production configuration may be defined by an administrator of the network security device (e.g., the customer). The network security device may be preconfigured with a network address and identifier. The network security device may be configured to automatically request and apply the deployment package at deployment time by use of the preconfigured network address and identifier. The network security device may automatically request and apply the production configuration from the configuration service in response to applying the deployment package.

19 Claims, 5 Drawing Sheets

(51) Int. Cl.
*H04L 12/24* (2006.01)
*H04L 29/12* (2006.01)
*G06F 21/45* (2013.01)
G06F 9/445 (2006.01)
G06F 3/06 (2006.01)
G06F 9/44 (2006.01)

(52) U.S. Cl.
CPC .................. *G06F 3/061* (2013.01); *G06F 8/76* (2013.01); *H04L 41/0809* (2013.01); *H04L 41/28* (2013.01); *H04L 61/00* (2013.01); *G06F 9/4401* (2013.01); *G06F 21/45* (2013.01); *H04L 41/0803* (2013.01)

(56) References Cited

U.S. PATENT DOCUMENTS

| | | |
|---|---|---|
| 2004/0123091 A1 | 6/2004 | Das |
| 2007/0298773 A1 | 12/2007 | Uematsu et al. |
| 2008/0098099 A1 | 4/2008 | Khasnis et al. |
| 2008/0155071 A1 | 6/2008 | Lindstrom |
| 2012/0002594 A1 | 1/2012 | Racz et al. |
| 2012/0047240 A1 | 2/2012 | Keohane et al. |
| 2012/0159468 A1 | 6/2012 | Joshi et al. |

OTHER PUBLICATIONS

Ramaswamy, Raju; "Secure data communication in local area networks"; Security Technology, 1990. Crime Countermeasures, Proceedings. IEEE 1990 International Carnahan Conference on DOI: 10.1109/CCST.1990.111399 Publication Year: 1990 , pp. 141-147.*

Chandramouli, R.; "Policy Specification and Enforcement for Smart ID Cards Deployment"; Policies for Distributed Systems and Networks, 2008. POLICY 2008. IEEE Workshop on Digital Object Identifier: 10.1109/POLICY.2008.14; Publication Year: 2008, pp. 127-134.

International Search Report and Written Opinion for PCT/US2013/066454 mailed Feb. 27, 2014.

* cited by examiner

US 9,003,485 B2

SYSTEMS AND METHODS FOR THE RAPID DEPLOYMENT OF NETWORK SECURITY DEVICES

TECHNICAL FIELD

This application relates to the deployment of information technology infrastructure and, in particular, to systems and methods for the rapid deployment of network security devices.

BRIEF DESCRIPTION OF THE DRAWINGS

This disclosure includes and references the accompanying drawings. In the drawings, similar symbols typically identify similar components, unless context dictates otherwise. The illustrative embodiments described in the detailed description, drawings, and claims are not meant to be limiting. Other embodiments may be utilized, and other changes may be made to these exemplary embodiments, without departing from the scope of the disclosure.

DETAILED DESCRIPTION

The proper deployment and configuration of network security devices can be a time-consuming task that requires the personal attention of highly trained personnel. These issues can be exacerbated when a large number of devices are to be deployed and/or when the devices must be deployed at different locations. Delegating deployment and configuration tasks to non-technical personnel can result in configuration problems, which may lead to downtime and/or breaches in security.

Disclosed herein are systems and methods for the rapid deployment of network security devices, wherein a network security device may be automatically configured using network-accessible security and management modules. An administrator may specify deployment- and/or device-specific configuration information, which may be embodied in a device-specific production configuration. The production configuration may be automatically pushed to the network security device when the device is deployed (e.g., when the network security device is initially powered on and/or is connected to a network).

Figure 1:
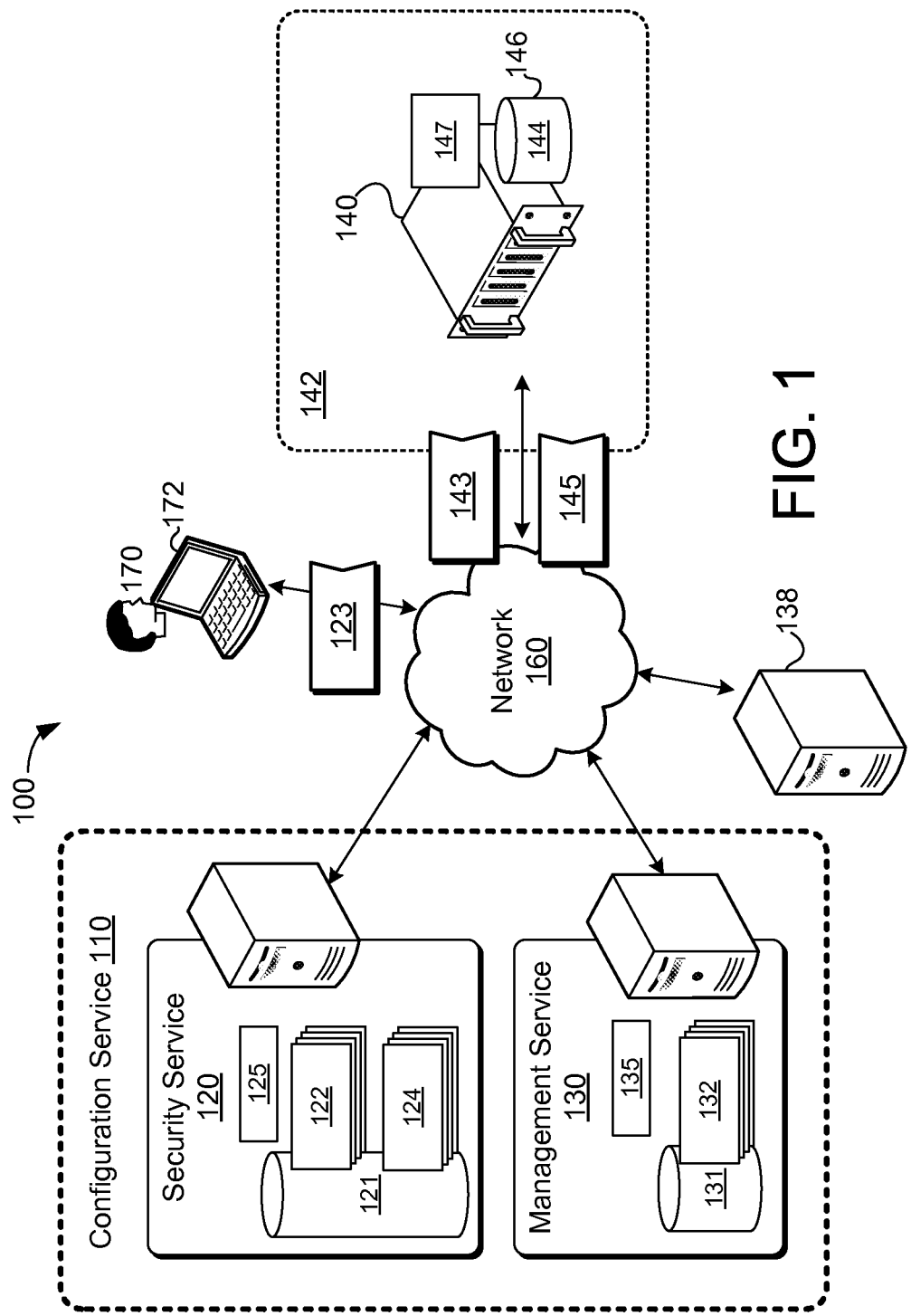
FIG. 1 depicts one embodiment of a system for the rapid deployment of network security devices.

FIG. 1 is a block diagram of one embodiment of a system 100 for the rapid deployment of network security devices. The system 100 may comprise a configuration service 110 configured to provide for automatically configuring a network security device 140 over a network 160. The network 160 may comprise a public communication network, such as the Internet, one or more local and/or private networks, a combination of networks, or the like. The network security device 140 may be automatically configured with a production configuration. Accordingly, the system 100 may be adapted to take the network security device 140 from a "default" state (e.g., factory default configuration and/or initial deployment state) to a production or ready state. As used herein, a "factory default state" refers to the state and/or configuration of the network security device 140 when the device 140 is initially manufactured, ships to an end-user, arrives at a deployment site 142, or the like. Alternatively, or in addition, the network security device 140 may be reset to the "factory default state" by an authorized entity 170 (e.g., customer, administrator, or the like).

The factory default state may comprise one or more preconfigured parameters 144, which may include, but are not limited to: a preconfigured network address, a device identifier, and the like. The preconfigured parameters 144 may be stored on a machine-readable storage 146 of the network security device 140. The machine-readable storage 146 may comprise one or more storage devices, which may include, but are not limited to: hard drives, electrically erasable programmable read only memories ("EEPROM"), solid-state storage media, optical storage media, or the like. The preconfigured parameters 144 may be stored in a read-only portion of the machine-readable storage 146 to prevent the preconfigured parameters 144 from being deleted, overwritten and/or modified. Alternatively, the preconfigured parameters 144 may be stored in a writable portion of the machine-readable storage 144, which may provide for updating the preconfigured parameters 144 by an authorized entity 170.

The preconfigured network address may correspond to a security service 120, which may be configured to provide a deployment package 122 to the network security device. The deployment package 122 may include a "bootstrap configuration," for the network security device 140, which may prepare the network security device 140 to acquire and/or deploy a production configuration 132 from the management service 130.

The deployment package 122 may be generated in response to a request 123 comprising an identifier of the network security device 140. The request 123 may be generated in response to the network security device 140 being activated, purchased, leased, deployed, licensed, or the like. The request 123 may be generated by an authorized entity 170 by use of a computing device 172; the authorized entity 170 may include, but is not limited to: the purchaser, lessee, licensee, of the network security device 140, and/or an authorized representative thereof, such as a network administrator. Alternatively, or in addition, the request 123 may be generated by an automated process, such as a point-of-sale system, an activation system, a support system, a licensing system, or the like. The request 123 may comprise an identifier of the network security device 140, such as a serial number, Media Access Control (MAC) address, hardware identifier, or the like. The request 123 may pertain to a particular network security device 140. Alternatively, or in addition, the request 123 may pertain to a plurality of different network security devices, each of which may be associated with a respective identifier (and/or other deployment package parameters).

The security service 120 may be configured to associate the deployment package 122 with a respective network security device identifier, such that the deployment package 122 of a particular network security device 140 can be uniquely identified and/or accessed based on the identifier of the particular network security device 140. The security service 120 may be further configured to store the deployment package 122 (in a machine-readable storage 121) until the deployment package 122 is requested by the network security device 140. In some embodiments, the security service 120 is configured to remove and/or delete the deployment package 122 after the expiration of a pre-determined retention time (e.g., 30 days).

The deployment package 122 may be adapted to configure the network security device 140 to obtain and apply a production configuration 132. The deployment package 122 may comprise a "deployment package" for the network security device 140), which may be derived from the request 123, properties and/or capabilities of the network security device 140, licensed features of the network security device 140, and so on. The deployment package 122 may include, but is not limited to: a feature key, a network address of the management service 130, and/or one or more credentials.

As used herein, a "feature key" refers to a data structure that activates one or more licensed features of the network security device 140. Accordingly, a feature key may determine the features the network security device 140 is licensed to provide at the deployment site 142. The feature key may be determined based on sales and/or licensing information associated with the device identifier of the request 123.

The deployment package 123 may include the network address of the management service 130, from which a device- and/or deployment-specific production configuration 132 for the network security device 140 may be obtained. In some embodiments, a customer may use a private or internal management service 130 that is configured to provide production configuration(s) 132 to network security devices deployed by the customer. Other customers may use other management services 130, such as a management service 130 provided by the manufacturer of the network security device 140, an Information Technology (IT) consulting provider (not shown), or the like. The deployment package 122 may specify one of a plurality of management services 130 from which the network security device 140 may obtain a deployment- and/or device-specific production configuration 132. The network address may be automatically populated by the security service 120 and/or may be specified in the request 123.

The one or more credentials of the deployment package 122 may comprise a shared secret or other cryptographic data for establishing a secure connection between the network security device 140 and the management service 130. Establishing a secure connection may comprise authenticating the network security device 140 to the management service 130 (and vice versa). Accordingly, the one or more credentials may include a public key certificate of the management service 130, which, for example, may be used to establish a Secure Sockets Layer (SSL) connection to the management service 130. The one or more credentials may further include and/or reference a certificate authority (CA) 138, which may be configured to verify and/or authenticate the public key certificate of the management service 130. The one or more credentials may further comprise a client identifier of the network security device 140 and/or device credential to authenticate the network security device 140 to the management service 130.

In some embodiments, the deployment package 122 may further comprise contact information for the authorized entity 170, administrative account configuration information, and a basic network configuration. The contact information may comprise one or more of an email address, Short Message Service (SMS) address, instant messaging (IM) address, or other contact information for the authorized entity 170. The contact information may be used to issue notifications to the authorized entity 170 regarding the operating state (e.g., deployment and/or configuration status) of the network security device 140.

The administrative account configuration information may include, but is not limited to: administrative account credentials for the network security device 140 (e.g., administrator username and/or password), one or more administrator credentials, or the like. The administrative account configuration information may be used to apply the production configuration to the network security device 140, as described herein.

The basic network configuration of the deployment package 122 may be configured to allow the network security device 140 to be externally managed by the management service 130. The basic network configuration may include a firewall policy configured to allow the network security device 140 to establish outgoing connections to the management service 130 and/or accept incoming connections from the management service 130. The basic network configuration may be further adapted to configure other network devices (e.g., firewalls, routers, switches, and the like, not shown) to allow the network security device 140 to be externally managed. Accordingly, the basic network configuration may be adapted to configure the other network devices to allow the network security device 140 to establish outgoing connections to the management service 130 and/or accept incoming connections therefrom.

Portions of the deployment package 122 may be specified in the request 123. For example, the request 123 may comprise the administrator contact information, administrative account configuration information, and/or the network address of the management service 130. Alternatively, these parameters may be automatically determined by the security service 120 and/or maintained in a customer-specific configuration. In some embodiments, the configuration service 110 (and/or security service 120) comprises a one or more customer records 124, which may be stored on the machine-readable storage 121. The customer records 124 may comprise information pertaining to the sale, license, and/or deployment of the network security device 140. For example, a customer record may indicate that the network security device 140 is licensed to perform a particular set of features, is to be shipped to a particular deployment site 142, and so on. In some embodiments, the security service 120 comprises an interface 125 through which the authorized entity 170 may enter and/or modify portions of the customer records 124. For example, the authorized entity 170 may enter the network address of the management service 130 to use in configuring the network security device 140, provide one or more credentials, set administrator account information, and so on. In some embodiments, the security service 120 uses the customer records 124 to generate the deployment package 122, which may comprise creating the feature key, generating a client name for the network security device 140, setting the network address of the management service 130, setting administrator account information, and so on.

The authorized entity 170 may generate a production configuration 132 for the network security device 140. The production configuration 132 may be specific to a particular deployment site 142 (deployment-specific configuration parameters), which may include, but are not limited to: deployment-specific security policies, firewall policies, Quality of Service (QoS) policies, and so on. The production configuration 132 may be defined in terms of deployment-specific network addresses, address ranges, names (e.g., network names, distinguished names, qualified names, or the like), and so on. The production configuration 132 may reference deployment-specific infrastructure, such as an X.509 directory (e.g., Lightweight Directory Access Protocol (LDAP) directory resources) configured to provide user and/or resource directory resources, policy services (e.g., authorization and/or authentication services), IT infrastructure (e.g., routers, switches, firewalls, etc.), and so on. The production configuration 132 may be specific to a particular type of network security device 140 and/or a particular set of licensed features (e.g., in accordance with the feature key, described above).

The production configuration 132 may be defined by the authorized entity 170 through an interface 135 of the management service 130 (by use of the computing device 172). For example, the interface 135 may be configured to provide a default production configuration 132, which the authorized entity 170 may customize with deployment- and/or device-specific configuration parameters. In some embodiments, the interface 135 may comprise a wizard configured to assist the authorized entity 170 with developing a production configuration 132.

The production configuration 132 may be stored on a machine-readable storage 131 of the management service 130 and/or may be associated with the identifier of the network security device 140 (e.g., device serial number). In some embodiments, the production configuration 132 may be associated with a human-readable name (e.g., friendly name) configured to associate the network security device 140 with a particular deployment and/or application (e.g., "Austin Office Firewall").

The network security device 140 may be configured for rapid deployment, which may comprise automatically applying the production configuration 132 at deployment time. Deploying the network security device 140 may comprise: initially powering on and/or booting up the network security device 140, connecting the network security device 140 to the network 160, and/or resetting the network security device 140 to the factory default state.

In some embodiments, the network security device 140 may comprise a rapid deployment module 147, which may be configured to manage one or more of: acquiring and/or applying the deployment package 122, acquiring and/or applying the production configuration 132, and so on. The rapid deployment module 147 may be further configured to maintain a "configuration state" of the network security device 140, as described herein.

Figure 2A:
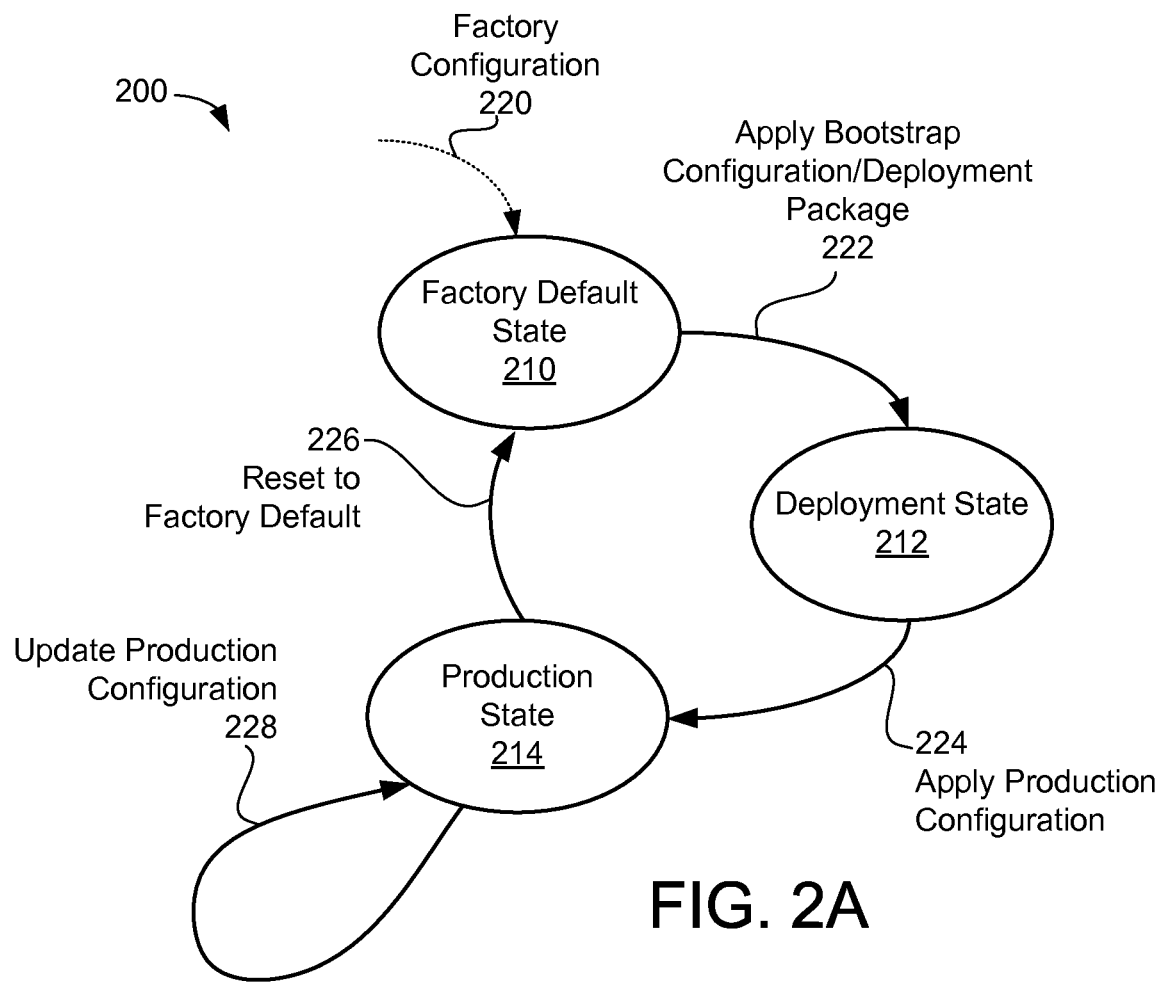
FIG. 2A depicts one embodiment of a configuration state transition diagram.

FIG. 2A depicts one embodiment of a state transition diagram 200 for a network security device 140. As used herein, a "configuration state" of the network security device 140 refers to the current state of rapid deployment operations. The configuration states of the network security device 140 may include, but are not limited to: a factory default state 210, a deployment state 212, and a production state 214. The factory default state 210 refers to an initial state of the network security device 140. The factory default state 20 may, therefore, refer to the state of the network security device 140 as the device 140 is received at the deployment site 142. Accordingly, the factory default state 210 may refer to a factory configuration 220 applied to the network security device 140 when the device 140 was manufactured and/or following a factory reset 226.

Figure 2B:
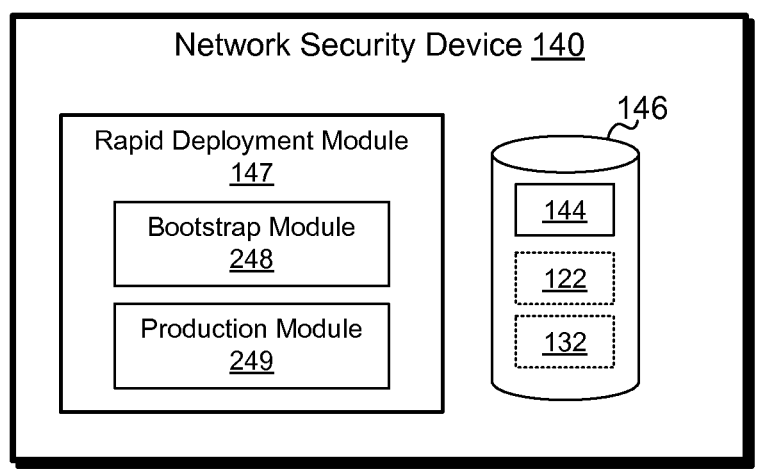
FIG. 2B depicts one embodiment of a rapid deployment module of a network security device.

Referring to FIG. 2B, when in the factory default state 210, the rapid deployment module 147 may be configured to acquire a deployment package 122 from the security module 120 (by use of the bootstrap module 248). The request may be generated using the preconfigured parameters 144 stored in the machine-readable storage 146 (e.g., the preconfigured network address of the security service 120 and/or the pre-configured device identifier). The bootstrap module 248 may be further configured to apply the deployment package 122 (e.g., deployment package), as described herein.

In response to applying the deployment package 122, the rapid deployment module 147 transitions 222 to the deployment state 212. In the deployment state 212, the production module 249 is configured to acquire the production configuration 132 of the network security device 140 from the management service 130 (by use of the deployment package 122, as disclosed herein).

In response to applying the production configuration 132, the rapid deployment module 147 transitions 224 the deployment state to the production state 214. In the production state 214 the network security device 140 is configured to operate in a production environment and in accordance with the production configuration 132 (e.g., the network security device 140 is up and running according to the deployment- and/or device-specific configuration parameters of the production configuration 132). The rapid deployment module 147 may transition back to the factory default state 210 in response to a factory reset operation 226. A factory reset operation 226 may be implemented by an authorized entity 170 (through an administration interface of the network security device 240), may be implemented in response to a crash and/or invalid shutdown, or other condition(s).

In some embodiments, the production module 249 may be further configured to update the production configuration 132 (e.g., in an update operation 228, as depicted in FIG. 2A). Updating the production configuration 132 may comprise receiving a new production configuration 132 from the management service 130. The new production configuration 132 may be pushed from the management service 130 to the network security device 140. Alternatively, or in addition, the production module 249 may be configured to periodically poll the management service 130 for updates to the production configuration 132 and/or the production module 249 may be configured to request updates in response to user configuration and/or settings.

Referring back to FIG. 1, as described above, at deployment time (and/or when operating in the factory default state 210), the network security device 140 may be configured to automatically request and/or apply the deployment package 122. In some embodiments, the network security device 140 may be configured to issue a request 143 for the deployment package 122 in response to one or more of: powering on, booting up, being connected to the network 160, being reset to a factory default state 210, or the like. The request 143 may be directed to the security service 120 and may comprise an identifier of the network security device 140. Accordingly, issuing the request 143 may comprise accessing one or more of the preconfigured parameters 144 stored on the machine-readable storage 146 of the network security device 140 (e.g., the preconfigured network address and/or the preconfigured device identifier).

In response to the request 143, the security service 120 may be configured to identify a corresponding deployment package 122 (if available). If no deployment package 122 associated with the identifier provided in the request 143 is available (e.g., has not yet been generated or has expired), the security service 120 may return an indication that no deployment package is available for the network security device 140; the security service 120 may be further configured to issue a notification to the authorized entity 170 indicating that the network security device 140 issued a request 143 that could not be fulfilled. Alternatively, or in addition, the network security device 140 (e.g., bootstrap module 248) may be configured to notify the authorized entity 170 that the request 143 to acquire and/or apply the deployment package 122 failed.

If a deployment package 122 for the network security device 140 is available, the security service 120 may be configured to provide the deployment package 122 associated with the identifier to the network security device 140. The network security device 140 may be configured to apply the deployment package 122, which may include, but is not limited to: applying the feature key of the deployment package 122, creating and/or configuring an administrative account of the network security device 140, configuring the network security device 140 to allow for external management by the management service 130, configuring other devices to allow the network security device 140 to be externally managed by the management service 130, and so on. Applying the feature key may comprise activating and/or enabling one or more licensed features of the network security device 140. Applying the deployment package 122 may further comprise rebooting and/or restarting the network security device 140 and/or modifying an operating state of the network security device 140 from the factory default state 210 to the deployment state 212. In some embodiments, the network security device 140 is further configured to notify the authorized entity 170 that the deployment package 122 successfully applied.

In the deployment state 212 (e.g., after successfully applying the deployment package 122), the network security device 140 may be configured to acquire and/or apply a production configuration 132. Acquiring the production configuration 132 may comprise issuing a request 145 to the management service 130. Issuing the request 145 may comprise establishing a secure connection to the management service 130, which may be identified by the management service network address of the deployment package 122. The secure connection may be established by use of one or more credentials in the deployment package 122, such as a shared secret, a client identifier for the network security device 140, a public key certificate of the management service 130, a CA certificate, and so on, as described herein. In some embodiments, the secure connection may comprise an SSL connection, authenticated by use of the public key certificate and/or CA certificate. In some embodiments, the security connection may comprise a mutually authenticated SSL connection, in which the network security device 140 is authenticated by use of a device certificate, shared secret, or other credential.

The request 145 may comprise one or more of the device identifier and/or client identifier, described above. The management service 130 may be configured to identify a production configuration 132 for the network security device 140 (if available) by use of the identifier(s) in the request 145. If no production configuration 132 is available for the network security device 140, the network security device 140 and/or authorized entity 170 may be notified, as described herein.

If a production configuration 132 is identified, the management service 130 may be configured to provide the production configuration 132 to the network security device 140 (e.g., via the secure connection established therebetween). The network security device 140 may apply the production configuration 132 (by use of the production module 249) and the network security device 140 may transition to the production state 214. The network security device 140 may be configured to notify the authorized entity 170 that the production configuration 132 was successfully applied.

Figure 3:
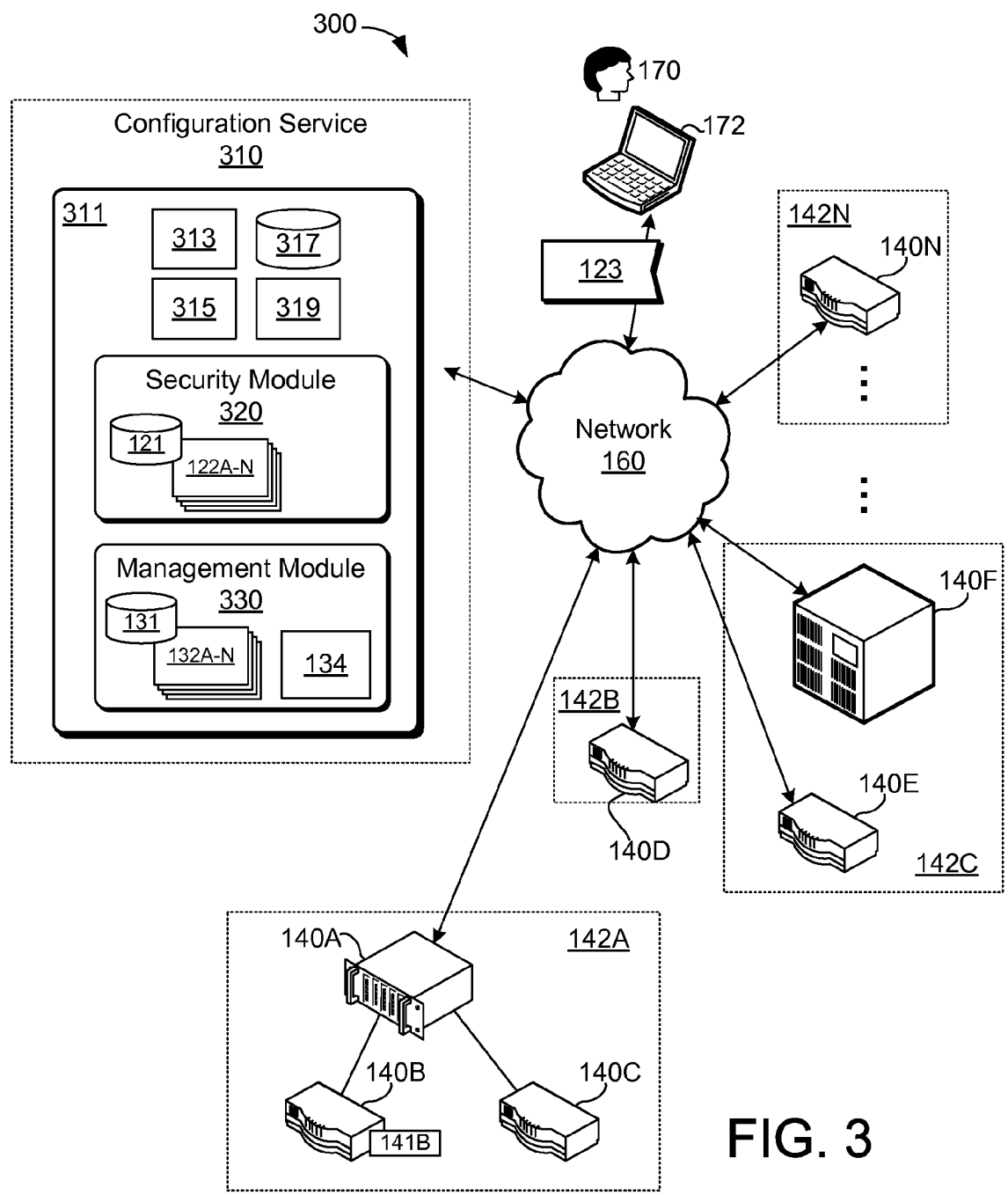
FIG. 3 depicts another embodiment of a system for the rapid deployment of network security devices.

FIG. 3 depicts another embodiment of a system 300 for the rapid deployment of network security devices 140A-N. The system 300 may comprise a configuration service 310, which may comprise a network-accessible service, such as a web-service, cloud-based service, or the like. Accordingly, the configuration service 310 may comprise, and/or be implemented using, a server computing device 311 comprising a processor 313, memory 315, machine-readable storage 317, one or more network interfaces 319, and the like. The processor 313 may comprise one or more general and/or special purpose processing elements, processing cores, programmable controllers and/or logic, and the like. The processor 313 may be configured to execute instructions stored in the memory 315, which may be loaded therein from the machine-readable storage 317 (or other source). Accordingly, portions of one or more of the modules and/or methods disclosed herein may be embodied as machine-readable instructions stored on the machine-readable storage 317. The configuration service 310 may be communicatively coupled to a network 160 by use of the one or more network interfaces 319, which may include, but are not limited to: wired network interfaces (e.g., Ethernet), wireless network interfaces (IEEE 802.11), or the like.

The configuration service 310 may comprise a security module 320 and a management module 330. The security module 320 may be configured to provide the features and/or functionality of the security service 120, and the management module 330 may be configured to provide the features and/or functionality of the management service 130, as described above. Although FIG. 3 depicts the modules 320 and 330 operating on the same computing device 311, the disclosure is not limited in this regard. In other embodiments, the security module 320 and management module 330 may be implemented on separate computing devices 311 (e.g., as depicted in FIG. 1).

The system 300 may comprise a plurality of network security devices 140A-N, which may be deployed at respective deployment sites 142A-N. Although not depicted in FIG. 3, one or more of the network security devices 140A-N may comprise a rapid deployment module 147 and/or a machine-readable storage 144 comprising a preconfigured parameters, such as a preconfigured network address of the configuration service 310 (and/or security module), and/or a device identifier, as described herein. The network security devices 140A-N may include different types of network security devices having different hardware configurations, capabilities, and so on. The network security devices 140A-N may be licensed to perform different functions in accordance with the security and/or functionality requirements at each deployment site 142A-N.

An authorized entity 170 may issue a single request 123 to generate respective deployment packages 122A-N for the network security devices 140A-N. The request 123 may comprise a listing of identifiers of the network security devices 140A-N (e.g., a list of serial numbers of the devices 140A-N). The request 123 may further comprise a network address of the management module 330, respective client names (e.g., friendly names) of the devices 140A-N, administrator contact information, administrative account information, and so on. The request 123 may be issued via a secure communication channel, such that the contents of the request 123 are encrypted and/or signed during transit within the network 160.

The security module 320 may generate a deployment package 122A-N for each network security device listed in the request 123. The deployment packages 122A-N may be associated with a respective network security device by device identifier (e.g., serial number), client name, or other identifier. The deployment packages 122A-N may be stored on a non-volatile storage (e.g., machine-readable storage 317). In some embodiments, the deployment packages 122A-N are encrypted using, inter alia, an encryption key or other credential provided in the request 123 and/or embedded within one or more of the deployment packages 122. The security module 320 may be configured to generate the deployment packages 122A-N based on requests 123 and/or contents of one or more customer records 124, as disclosed herein.

The authorized entity 170 may access the management module 330 to generate a respective device- and/or deployment-specific production configuration 132A-N for each of the network security devices 140A-N, as described above. The production configurations 132A-N may comprise parameters specified by the authorized entity 170 (e.g., administrator). The authorized entity 170 may generate the production configurations 132A-N by use of an interface 135 of the management module 330 (e.g., by accessing a wizard interface using a computing device 172). The management module 330 may be configured to store the production configurations 132A-N on a machine-readable storage 131 and/or the production configurations 132A-N may be encrypted, as described herein.

The network security devices 140A-N may be deployed at the deployment sites 142A-N by non-technical personnel. At deployment time, each network security device 140A-N may be configured to automatically acquire and apply a respective deployment package 122A-N, which may configure the network security devices 140A-N to acquire and apply a respective production configuration 132A-N, as described above. Accordingly, a large number of network security devices 140A-N may be deployed, without the need for technically skilled personnel at each deployment site 142A-N.

Figure 4:
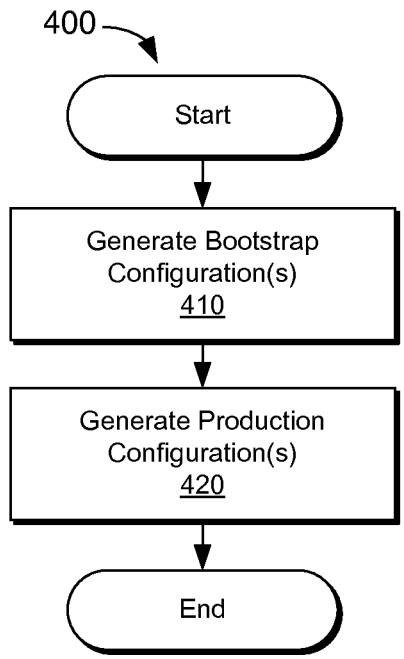
FIG. 4 is a flow diagram of one embodiment of a method for the rapid deployment of network security devices.

FIG. 4 is a flow diagram of one embodiment of a method 400 for the rapid deployment of network security devices. The method 400, and the other methods disclosed herein, may be embodied, at least in part, as instructions stored on a machine-readable storage. The instructions may be configured for execution by components of a computing device to thereby implement steps of the disclosed methods. Accordingly, starting and/or initializing the method 400 may comprise loading one or more instructions from a machine-readable storage medium and/or accessing computing device components and/or resources.

Step 410 may comprise generating a deployment package 122 for one or more network security devices 140. Step 410 may comprise issuing a request 123 to a security service 120 and/or security module 320 comprising one or more device identifiers, such as serial numbers, MAC addresses, or the like. The request 123 may further comprise a network address of a management service 130 and/or management module 330.

The deployment package 122 generated at step 410 may comprise a feature key, a network address of a management service 130 and/or management module 330, one or more credentials, contact information for an administrator of the network security device 140, administration account information, and/or a basic network configuration. The deployment package 122 may be automatically generated and/or may be derived from parameters provided in the request 123 and/or customer account information of the security service 120 and/or security module 320.

Step 410 may further comprise storing the deployment package 122 on a machine-readable storage medium, associating the deployment package 122 with an identifier of the network security device 140 and/or making the deployment package 122 available at a security service 120 and/or security module 320.

Step 420 may comprise generating a production configuration 132 for the network security device 140. The production configuration 132 may comprise one or more deployment- and/or device-specific configuration parameters. One or more of the parameters may be specified by the authorized entity 170 (e.g., through an interface of a management service 130 and/or management module 330).

Step 420 may further comprise storing the production configuration 132 on a machine-readable storage medium, associating the production configuration 132 with one or more identifiers of the network security device 140, and/or making the production configuration 132 available at the management service 130 and/or management module 330.

Figure 5:
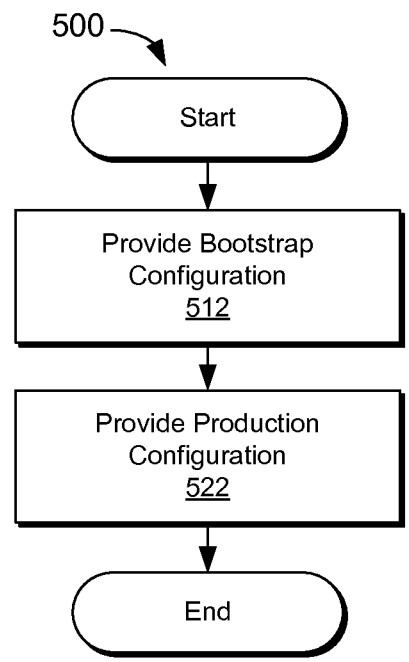
FIG. 5 is a flow diagram of one embodiment of a method for the rapid deployment of network security devices.

FIG. 5 is a flow diagram of another embodiment of a method 500 for the rapid deployment of network security devices.

Step 512 may comprise providing a deployment package 122 to a network security device 140. Step 512 may be performed at a security service 120 and/or security module 320 in response to a request 143. The request 143 may comprise, inter alia, an identifier of the network security device. Step 512 may comprise identifying a deployment package 122 associated with the identifier in a machine-readable storage 121, which may comprise a relational database, directory, or the like. Step 512 may comprise transmitting the identified deployment package 122 to the network security device 122 via the network 160. The deployment package 122 may be transmitted via a security communication channel (e.g., SSL), may be encrypted, signed, or the like. Step 512 may further comprise notifying an authorized entity 170 that a deployment package 122 was provided to the network security device 140.

If no deployment package 122 associated with the identifier is found, step 512 may comprise notifying the network security device 140 (and/or other authorized entity 170) that the request 143 could not be fulfilled.

Step 522 may comprise providing a production configuration to the network security device 140. Step 522 may be performed at a management service 130 and/or management module 330 in response to a request 145. The request 145 may comprise, inter alia, an identifier and/or client identifier associated with the network security device 140, one or more credentials, and the like. Step 522 may comprise establishing a secure connection with the network security device 140 and/or authenticating the request 145. Step 522 may further comprise providing one or more credentials to allow the network security device 140 to authenticate the management service 130 and/or management module 330. Step 522 may comprise a key and/or signature exchange, verifying one or more public key certificates using a certificate authority 138, and the like. In some embodiments, step 522 comprises establishing an SSL connection and/or a mutually authenticated SSL connection.

Step 522 may further comprise identifying a production configuration 132 associated with the identifier and/or client identifier in the machine-readable storage 131 in response to establishing the secure connection and/or authenticating the request 145. The identified production configuration 132 may be transmitted to the network security device 145 via the network 160 using the secure communication channel. Alternatively, or in addition, the production configuration 132 may be encrypted and/or signed for transmission to the network security device 140.

If no production configuration 132 associated is found, step 522 may comprise notifying the network security device 140 (and/or other authorized entity 170) that the request 145 could not be fulfilled.

Figure 6:
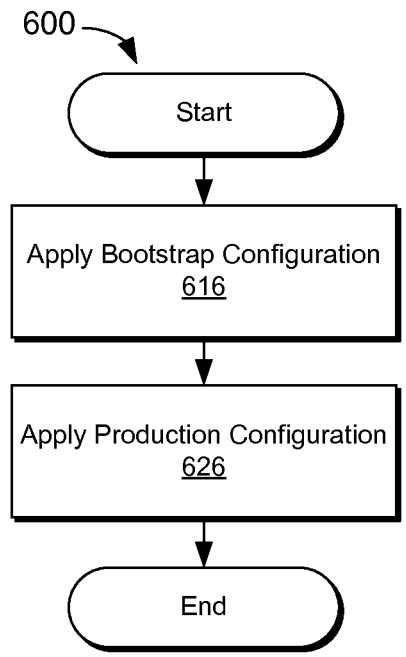
FIG. 6 is a flow diagram of one embodiment of a method for the rapid deployment of network security devices.

FIG. 6 is a flow diagram of another embodiment of a method 600 for the rapid deployment of network security devices.

Step 616 may comprise a network security device 140 applying a deployment package 122. Step 616 may be performed in response to the network security device 140 powering on and/or booting up in a factory default state 210, as described above.

Step 616 may comprise issuing a request 143 for a deployment package 122. The request 143 may be issued from the network security device 140 (e.g., generated by a bootstrap module 248 of a rapid deployment module 147), and may include one or more preconfigured parameters 144 stored on a machine-readable storage 146 of the network security device 140, such as a preconfigured network address of a security service 120 and/or security module 320, a device identifier, and the like. The request 143 may be transmitted to the security service 120 and/or security module 320 via a network 160. The request 143 may be sent via a secure connection (e.g., SSL connection), may be encrypted and/or signed by the network security device 140, or otherwise secured.

Step 616 may further comprise receiving the deployment package 122 from the security service 120 and/or security module 320. The deployment package 122 may include, but is not limited to: a feature key of the network security device 140, a network address of a management service 130 and/or management module 130, one or more credentials, administrator contact information, administrator account configuration information, a basic network configuration, and the like. The network security device 140 may apply the deployment package 122 by, inter alia, activating and/or enabling device features of the feature key, configuring an administrator account in accordance with the administrator account configuration information (e.g., creating and/or modifying one or more accounts on the network security device 140), applying the basic network configuration, and so on, as described herein. Step 616 may further comprise rebooting and/or restarting the network security device 140 and/or notifying an administrator that the deployment package 122 was successfully applied. In some embodiments, step 616 further comprises transitioning a configuration state of the network security device from the factory default state 210 to the deployment state 212.

Step 626 may comprise the network security device 140 applying a production configuration 132. Step 626 may be performed in response to the network security device 140 applying the deployment package 122 and/or transitioning to the deployment state 212.

Step 626 may comprise issuing a request 145 for the production configuration 132. The request 145 may be issued from the network security device 140 (e.g., generated by a production module 248 of a rapid deployment module 147), and may include one or more parameters from the deployment package 122, such as the network address of the management service 130 and/or module 330, one or more credentials, one or more identifiers, and the like. Step 626 may comprise establishing a secure connection and/or authenticating the management service 130 and/or management module 330. Step 626 may comprise verifying one or more credentials, signatures, pubic key certificates (e.g., by use of a certificate authority 138), and the like. Step 626 may further comprise authenticating the request 145 and/or network security device 140 to the management service 130 and/or management module 130, which may comprise providing one or more credentials, signing and/or encrypting nonce data, establishing an SSL connection (e.g., mutually authenticated SSL), and the like. The request 145 may be sent via a secure connection (e.g., SSL connection), may be encrypted and/or signed by the network security device 140, or otherwise secured.

Step 626 may further comprise receiving the production configuration 132 from the management service 130 and/or management module 330. The production configuration 132 may include, but is not limited to: a configuration of the features defined in the feature key of the network security device 140, one or more deployment- and/or device-specific configuration parameters, a deployment and/or device-specific security policy, and so on, as described herein. Step 626 may further comprise rebooting and/or restarting the network security device 140 and/or notifying an administrator that the production configuration 132 was successfully applied. In some embodiments, step 626 further comprises transitioning a configuration state of the network security device from the deployment state 212 to the production state 214.

Figure 7:
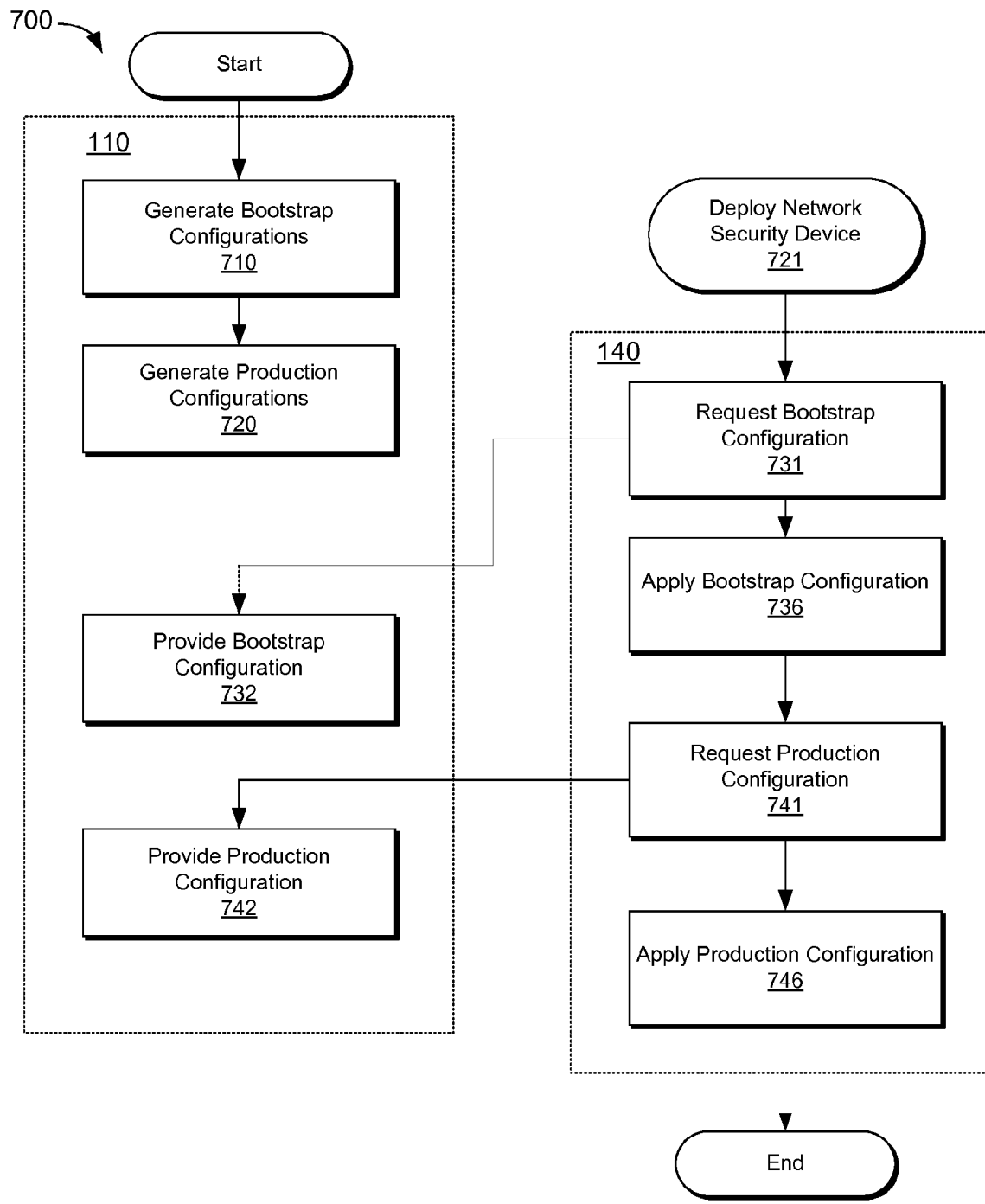
FIG. 7 is a flow diagram of one embodiment of a method for the rapid deployment of network security devices.

FIG. 7 is a flow diagram of another embodiment of a method 700 for the rapid deployment of network security devices. Steps 710, 720, 732, and 742 may be performed by one or on services and/or modules of the configuration service 110 and steps 731, 736, 741, and 746 may be performed by and/or on network security device 140.

Step 710 may comprise generating a deployment packages 122A-N for one or more network security devices 140A-N on a security service 120 and/or security module 320, as described herein. Step 710 may further comprise storing the deployment packages 122A-N, making the deployment packages 122A-N available to the network security devices 140A-N (e.g., associating the deployment packages 122A-N with respective device identifiers), and/or awaiting requests 143 for the deployment packages 122A-N.

Step 720 may comprise generating one or more production configurations 132A-N for one or more network security devices 140A-N on a management service 130 and/or management module 330, as described herein. Step 720 may further comprise storing the production configurations 132A-N, making the production configurations 132A-N available to the network security devices 140A-N (e.g., associating the production configurations 132A-N with respective credentials, identifiers, client names, or the like), and/or awaiting requests 145 for the production configurations 132A-N.

Step 721 may comprise deploying a network security device 140A-N at a deployment site. Step 721 may comprise powering on and/or booting up a network security device 140A-N in a factory default state 210 and/or resetting the network security device 140A-N to the factory default state 210. Step 721 may be performed by non-technical personnel and may comprise providing power to the network security device 140A-N and connecting the network security device 140A-N to the network 160.

Step 731 may comprise requesting a deployment package 122A-N. Step 731 may comprise generating and/or issuing a request 143 to a security service 120 and/or security module 320 by use of a preconfigured network address and/or device identifier, as described above.

Step 732 may comprise providing a deployment package 122A-N to the network security device 140A-N in response to the request 143, as described above. Step 732 may, therefore, comprise identifying a deployment package 122A-N associated with an identifier in the request 143, and transmitting the identified deployment package 122A-N to the network security device 140 via the network 160.

Step 736 may comprise applying the deployment package 122A-N to the network security device 140A-N, as described herein. Step 736 may comprise transitioning 222 the configuration state of the network security device 140 from the factory default state 210 to the deployment state 212. Step 736 may further comprise notifying the administrator (or other authorized entity) that the deployment package 122A-N was successfully applied.

Step 741 may comprise requesting a production configuration 132A-N. Step 741 may comprise generating and/or issuing a request 145 to a management service 130 and/or management module 130, as described herein. Step 742 may comprise providing the production configuration 132A-N to the network security device 140A-N in response to the request 145. Step 742 may comprise identifying the production configuration 132A-N based on one or more identifiers and/or credentials in the request 145. Steps 741 and/or 742 may further comprise establishing a secure connection and/or authenticating the network security device 140 and the management service 130 and/or management module 330.

Step 746 may comprise applying the production configuration 132A-N to the network security device 140A-N, as described herein. Step 746 may further comprise transitioning 224 the configuration state of the network security device 140A-N from the deployment state 212 to the production state 214. Step 746 may further comprise notifying an administrator (or other authorized entity) that the production configuration 132A-N was successfully applied, and operating the network security device 140A-N in accordance with the production configuration 132A-N at the deployment site 142A-N.

The above description provides numerous specific details for a thorough understanding of the embodiments described herein. However, those of skill in the art will recognize that one or more of the specific details may be omitted, or other methods, components, or materials may be used. In some cases, operations are not shown or described in detail.

Furthermore, the described features, operations, or characteristics may be combined in any suitable manner in one or more embodiments. It will also be readily understood that the order of the steps or actions of the methods described in connection with the embodiments disclosed may be changed as would be apparent to those skilled in the art. Thus, any order in the drawings or Detailed Description is for illustrative purposes only and is not meant to imply a required order, unless specified to require an order.

Embodiments may include various steps, which may be embodied in machine-executable instructions to be executed by a general-purpose or special-purpose computer (or other electronic device). Alternatively, the steps may be performed by hardware components that include specific logic for performing the steps, or by a combination of hardware, software, and/or firmware.

Embodiments may also be provided as a computer program product including a computer-readable storage medium having stored instructions thereon that may be used to program a computer (or other electronic device) to perform processes described herein. The computer-readable storage medium may include, but is not limited to: hard drives, floppy diskettes, optical disks, CD-ROMs, DVD-ROMs, ROMs, RAMs, EPROMs, EEPROMs, magnetic or optical cards, solid-state memory devices, or other types of medium/machine-readable medium suitable for storing electronic instructions.

As used herein, a software module or component may include any type of computer instruction or computer executable code located within a memory device and/or computer-readable storage medium. A software module may, for instance, comprise one or more physical or logical blocks of computer instructions, which may be organized as a routine, program, object, component, data structure, etc., that perform one or more tasks or implements particular abstract data types.

In certain embodiments, a particular software module may comprise disparate instructions stored in different locations of a memory device, which together implement the described functionality of the module. Indeed, a module may comprise a single instruction or many instructions, and may be distributed over several different code segments, among different programs, and across several memory devices. Some embodiments may be practiced in a distributed computing environment where tasks are performed by a remote processing device linked through a communications network. In a distributed computing environment, software modules may be located in local and/or remote memory storage devices. In addition, data being tied or rendered together in a database record may be resident in the same memory device, or across several memory devices, and may be linked together in fields of a record in a database across a network.

It will be understood by those having skill in the art that many changes may be made to the details of the above-described embodiments without departing from the underlying principles thereof.

We claim:

1. A configuration service, comprising:
a security server configured to associate an identifier of a network security device with a deployment package, wherein the network security device comprises a persistent storage medium storing a preconfigured network address of the security server, wherein the network security device is configured to transmit a request for the deployment package to the preconfigured network address, wherein the request comprises the identifier of the network security device, and
wherein the security server is configured to receive the request for the deployment package transmitted from the network security device to the preconfigured network address and to transmit the deployment package to the network security device in response to determining that the identifier of the request corresponds to the identifier associated with the deployment package; and
a management server configured to associate the device identifier with a production configuration, the production configuration comprising a deployment-specific security policy comprising one or more deployment-specific configuration parameters for the network security device, wherein the management server is configured to provide the production configuration to the network security device in response to a request from the network device comprising the credential of the deployment package.

2. The configuration service of claim 1, wherein the deployment package further comprises one or more of a feature key configured to define one or more licensed features of the network security device, a network address of the management server, and a certificate of the management server.

3. The configuration service of claim 1, wherein the deployment package is configured to configure the network security device to accept the production configuration from the management server.

4. The configuration service of claim 1, wherein the device identifier comprises a serial number.

5. The configuration service of claim 1, wherein the management server is configured to delete the production configuration associated with the network security device after a predetermined time period.

6. The configuration service of claim 1, further comprising a configuration wizard configured to provide for defining the production configuration, wherein the configuration wizard provides for specifying the one or more configuration parameters specific to the deployment of the network security device.

7. The configuration service of claim 1, wherein the network security device is configured to:
   request the deployment package from the security server in response to the network security device powering on and/or being communicatively coupled to a network;
   request the production configuration from the management server in response to applying the deployment package; and
   apply the production configuration in response to receiving the production configuration from the management server.

8. The configuration service of claim 1, wherein requesting the production configuration comprises establishing a secure communication channel with the management server by use of a credential provided in the deployment package.

9. The configuration service of claim 1, wherein requesting the production configuration comprises establishing a secure communication channel with the management server by use of a credential provided in the deployment package.

10. The configuration service of claim 1, wherein the security server is configured to issue a notification to the administrator of the network security device in response to providing the deployment package to the network security device.

11. The configuration service of claim 1, wherein the management server is configured to issue an email to a predetermined recipient in response to providing the production configuration to the network security device.

12. A method for automatically configuring a network security device, comprising:
   associating a network security device with a deployment package at a network-accessible security service
   associating the network security device with a production configuration at a management service;
   writing a preconfigured network address to persistent storage of the security service, wherein the network security device is configured to issue a request for the deployment package to the preconfigured network address;
   receiving a request for a deployment package from the network security device at the preconfigured network address;
   providing the deployment package to the network security device in response to receiving the request; and
   providing a production configuration to the network security device in response to a request from the network security device at the management service, the request comprising a credential of the deployment package, wherein the production configuration comprises a configuration of one or more security features of the network security device.

13. The method of claim 12, wherein the deployment package comprises a username and password of the administrator account.

14. The method of claim 12, wherein the deployment package comprises a shared secret, and wherein providing the production configuration comprises establishing a secure connection between the management server and network security device by use of the shared secret.

15. The method of claim 12, wherein the deployment package comprises a public key certificate configured to provide for authenticating the management server.

16. The method of claim 12, further comprising generating the production configuration based on one or more configuration parameters provided by an administrator of the network security device.

17. The method of claim 12, further comprising activating the network security device, wherein activating comprises assigning a feature key to the network security device in accordance with one or more licensed features of the network security device.

18. An apparatus, comprising:
   a network security device comprising a processor and a machine-readable storage medium preconfigured with a network address of a security server and a device identifier;
   a bootstrap module of the network security device configured to send a request for a deployment package to the preconfigured network address of the security server in response to coupling the network security device to a network, the request comprising the device identifier, to receive the deployment package in response to sending the request, and to apply the received deployment package to the network security device, wherein the deployment package comprises a network address of a management server and a credential; and
   a production module of the network security device configured to apply a production configuration to the network security device, the production configuration received in response to establishing a secure connection with the management server using the credential and the network address of the deployment package, wherein the configuration agent is configured to apply the production configuration using the administrator account.

19. The apparatus of claim 18, further comprising a rapid deployment module of the network security device configured to transition a configuration state of the network security device from a factory default state to a deployment state in response to applying the deployment package and to transition the configuration state of the network security device from the deployment state to a production state in response to applying the production configuration.

* * * * *